United States Patent [19]
Bril et al.

[11] Patent Number: 5,841,418
[45] Date of Patent: Nov. 24, 1998

[54] DUAL DISPLAYS HAVING INDEPENDENT RESOLUTIONS AND REFRESH RATES

[75] Inventors: Vald Bril, Campbell; Rakesh Bindlish, San Jose; Ken Fuiks, Fremont; Robin Sungsoo Han, Saratoga; Sridhar Kotha, Fremont; Alexander Julian Eglit, San Carlos, all of Calif.

[73] Assignee: Cirrus Logic, Inc., Fremont, Calif.

[21] Appl. No.: 483,584

[22] Filed: Jun. 7, 1995

[51] Int. Cl.⁶ .................................................. G09G 5/00
[52] U.S. Cl. ................................. 345/3; 345/1; 345/115
[58] Field of Search ............................... 345/1, 2, 3, 114, 345/115, 204, 213

[56] References Cited

U.S. PATENT DOCUMENTS

| | | | |
|---|---|---|---|
| 4,684,935 | 8/1987 | Fujisaku et al. ............................. | 345/1 |
| 4,926,166 | 5/1990 | Fujisawa et al. . | |
| 5,046,027 | 9/1991 | Taaffe et al. ................................ | 345/1 |
| 5,150,109 | 9/1992 | Berry . | |
| 5,218,274 | 6/1993 | Zenda . | |
| 5,309,168 | 5/1994 | Itoh et al. . | |
| 5,327,156 | 7/1994 | Masukane et al. ......................... | 345/3 |
| 5,374,941 | 12/1994 | Yuki et al. . | |
| 5,479,184 | 12/1995 | Tokumitsu .................................. | 345/3 |
| 5,488,385 | 1/1996 | Singhal et al. .............................. | 345/1 |
| 5,499,036 | 3/1996 | Hauck ......................................... | 345/3 |
| 5,508,714 | 4/1996 | Zenda ......................................... | 345/3 |
| 5,559,525 | 9/1996 | Zenda ......................................... | 345/3 |
| 5,608,418 | 3/1997 | McNally ..................................... | 345/1 |

FOREIGN PATENT DOCUMENTS

| | | | |
|---|---|---|---|
| 0354480 | 2/1990 | European Pat. Off. .................. | 345/3 |
| 63-277086 A | 9/1988 | Japan . | |
| 2077085 | 3/1990 | Japan ......................................... | 345/3 |
| 3007987 | 1/1991 | Japan ......................................... | 345/3 |
| 4122985 A | 4/1992 | Japan . | |

*Primary Examiner*—Richard A. Hjerpe
*Assistant Examiner*—Kent C. Lang
*Attorney, Agent, or Firm*—Robert P. Bell; Steven A. Shaw

[57] ABSTRACT

A video controller for controlling at least two video displays having independent refresh rates and pixel resolutions. In a first embodiment, two separate data paths are provided within a video controller for each video display (e.g., CRT and LCD). Taking advantage of the increased bandwidth of 64 bit wide DRAMS, data for each data path may be retrieved in separate read cycles. Each datapath may operate at its own clock frequency characteristic of refresh rate and pixel resolution. The dual data path embodiment also reduces the complexity of the software model needed to drive such dual displays. IN an alternative embodiment, a single data path may be provided within a video controller to drive data for two video displays having independent refresh rates and pixel resolutions. A data "tag" (extra bit) is attached to each word or dword passing through the data path indicating the destination (e.g., CRT or LCD) of the video data. At the output of the data path, separate FIFOs (e.g., LCD and CRT) are provided to temporarily store video data. FIFO pointers are fed back to a sequence controller to drive data read cycles from display memory. The use of tags and FIFO pointer feedback allows two video displays to be driven at different data rates, allowing for independent resolution and refresh rates in each display.

21 Claims, 6 Drawing Sheets

DUAL DISPLAYS HAVING INDEPENDENT RESOLUTIONS AND REFRESH RATES

CROSS-REFERENCE TO RELATED APPLICATIONS

The subject matter of this application is related to that in co-pending applications Ser. No. 08/130,577, filed Oct. 1, 1993 entitled "DUAL DISPLAY VIDEO CONTROLLER", Ser. No. 08/235,764, filed Apr. 29, 1994, entitled "VARIABLE PIXEL DEPTH AND FORMAT FOR VIDEO WINDOWS", and Ser. No. 08/359,315, filed Dec. 19, 1994, entitled "MEMORY BANDWIDTH OPTIMIZATION", all three of which are incorporated herein by reference.

FIELD OF THE INVENTION

The present invention is directed to video controllers and video controller integrated circuits for computer displays. The present invention may have particular application to so-called multimedia methodology and in graphical user interfaces (GUIs).

BACKGROUND OF THE INVENTION

As described in co-pending application Ser. No. 08/130,577, filed Oct. 1, 1993 entitled "DUAL DISPLAY VIDEO CONTROLLER", it may be desirable to generate two video display signals from one video controller in order to simultaneously display two different video images on two separate video displays.

Figure 1:
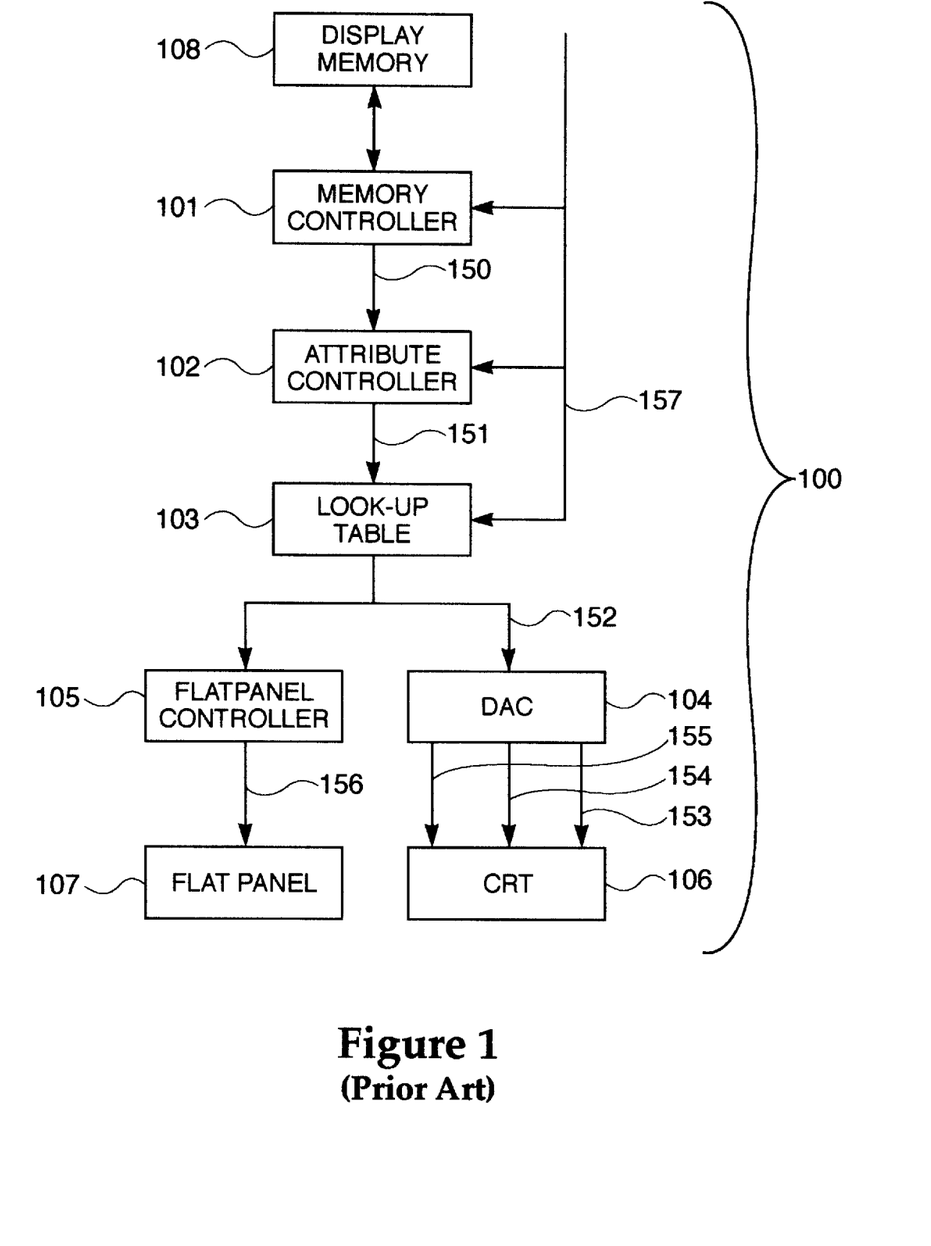
FIG. 1 is a schematic diagram of a prior art video controller.

FIG. 1 is a block diagram of a prior art video controller 100 which may display a video image to both CRT display 106 (or external display) and an internal flat panel display 107 (e.g., LCD flat panel display or the like). Display memory 108 may comprise a random access memory (e.g., DRAM, SRAM and the like) which may be accessed through memory controller 101. Display memory 108 may also be known as a video memory or VMEM in the graphic controller arts. However, due to the advent of Motion Video™ displays in computer systems, the term "video memory" may be a misnomer. Thus, for the purposes of this application, such a memory will be referred to as a display memory.

The size of display memory 108 may be determined by the amount of data to be displayed at one time. For example, for a 640 by 480 pixel monochrome display, a minimum of 307,200 bits of data may be needed. If a multi-color or gray scaled monochrome display is desired, then the necessary number of bits per pixel may be increased. For example, if eight bits are provided for each pixel, then each pixel may take one of $2^8$ or 256 colors (or gray scales). For eight bits of data per pixel, a 640 by 480 pixel display may require a minimum of 2,457,600 bits of information, or 76.8 Kilobytes of DRAM, where each word comprises 32 bits (four 8-bit bytes), representing four pixels. In practice, a standard size memory of 1 Megabyte may be used and more than one frame of video stored at one time.

As shown in FIG. 1, memory controller 101 may access display memory 108 and pass to attribute controller 102 one word 150 (32 bits) from display memory 108, preferably using a page mode addressing scheme. Attribute controller 102 may contain a register (not shown) for holding four pixel bytes 151 of eight bits each, from 32 bit word 150 supplied by from display memory 108. Attribute controller 102 may output each of the eight bit pixel bytes 151 in sequence to look-up table 103. Look-up table 103 may comprise another random access memory having, in this example, at least 256 addresses.

Look-up table 103 may then convert each of the eight bit pixel bytes 151 into an eighteen bit binary number (hereinafter referred to as pixel word 152) representing a pixel color (or gray scale). Look-up table 103 may then take one of the four eight bit pixel bytes 151 as an address for its internal random access memory and outputs an eighteen bit binary number stored as that address as pixel word 152 representing the color (or gray scale) for that pixel.

Individual computer application programs may be able to alter the contents of look-up table 103 such that any or all of the 256 available colors may be selected from a palette of $2^{18}$ or 262,144 colors. Of course, other numbers of bits may be used to provide a broader range or palette of available colors. Further, although only 256 of these colors are shown here as being available at one time, other numbers of colors per pixel may be used by increasing the number of bits per pixel byte 151.

From look-up table 103, the eighteen bit pixel word 152 may be transferred to DAC 104. DAC 104 may comprise a digital-to-analog converter which may converts an eighteen bit pixel word 152 into analog RGB (Red, Green, Blue) signals 153, 154, and 155 to drive analog CRT display 106. In the embodiment shown in FIG. 1, six bits each from eighteen bit pixel word 152 are used to create analog signals 153, 154, and 155 for Red, Green and Blue levels. DAC 104 typically comprises a number of current sources which may be added together in a binary fashion to create an appropriate analog signal level for each of the outputs 153, 154, 155 corresponding to a selected six bits of the eighteen bit pixel word 152.

Flat panel display 107 (which may comprise an active or passive LCD flat panel display, plasma display, electroluminescent display or the like), however, does not rely upon an analog signal to determine pixel intensity or color. Thus, in order to provide a simultaneous display on both CRT display 106 and flat panel display 107, two different drive signals may be generated. As shown in FIG. 1, eight bit pixel bytes 151 are converted via look-up table 103 into eighteen bit pixel words 152. Flat panel controller 105 may use eighteen bit pixel words 152 to generate an appropriate video display on flat panel display 107.

For a monochrome display, the eighteen bit pixel word 152 may be converted into a grayscale value using an appropriate internal conversion algorithm. Flat panel controller 105, using frame rate modulation and dithering techniques, may generate this grayscale on flat panel display 107. For a color display, eighteen bit pixel word 152 may be converted into separate red, green and blue sub-pixels.

Flat panel controller 105, using frame rate modulation (for passive LCD panels) and dithering techniques (for active and passive LCD panels), may generate appropriate color intensities for each subpixel. Such frame rate modulation and dithering techniques are described in Bassetti, Jr., U.S. Pat. No. 5,122,783, issued Jun. 16, 1992, assigned to the same assignee as the present application and incorporated herein by reference. Thus, with the apparatus of FIG. 1, it is possible to display the same image on both flat panel display 107 and CRT display 106.

The apparatus of FIG. 1 utilizes common elements for much of the data paths for CRT 106 and Flat Panel 107. Data for both displays is passed through attribute controller 102 and look-up table 103 before being diverted to either DAC 104 or flatpanel controller 105. Such an arrangement may conserve hardware resources, however, in such an arrangement, it may be difficult to provide two display images on dissimilar displays at different refresh rates or pixel resolutions.

So-called "multimedia" presentations have become increasingly popular. These presentations usually, as the name implies, use a variety of media (e.g., sound, image, video or the like) to make an information presentation such as a sales promotion, or educational lecture. For the travelling lecturer, a powerful lap-top or notebook computer, coupled to a portable LCD projector screen and overhead projector may provide a dynamic and effective presentation.

An LCD projector screen can be coupled to an external video port (e.g., VGA, EGA or the like) of most portable computers and, when coupled to an overhead projector, project a display image onto a wall or screen. Other types of LCD projector screens incorporate the projector (e.g., light source, focusing lenses) into one compact unit. Alternately, a large, high resolution monitor can be used to provide a presentation display for a small to medium sized group. A computer allows the use of action video and colorful special effects, and in addition avoids the problems associated with using a stack of overhead transparencies.

However, when such multimedia display equipment is used with conventional portable computers, at best, only the same image can be displayed on both displays (internal or projected) at the same time. In many instances, it is desirable to project the presentation display on an external monitor while displaying other information (e.g., speaker's notes or the like) on an internal display. It may also be desirable to be able to switch images between the two displays, such that a speaker can preview an image before projecting the image to the viewing audience.

In addition, the need for two video displays containing different images may arise in other situations where computers are used, such as CAD systems, spreadsheets, word processors or the like. In particular, the use of the Windows™ environment may make it desirable to allow a user to open one window (or application) on a first video display (e.g., laptop flat panel display) and open another application on another display (e.g., external monitor). Thus, for example, a user may be able to display a scheduler (daily organizer) program on one display while operating a word processing program on another.

Moreover, it may be desirable to provide a portable or non-portable computer with the ability to operate more than one video display. One shortcoming of the Windows™ software and other Graphical User Interfaces (GUIs) is that the user may be required to view his windows through the tight aperture of the traditional 14 inch monitor. The use of dual displays may allow a user to more readily operate in a true multitasking environment with an increased usable display area.

The prior art approach to providing multiple displays with different images driven by one computer has been to provide separate video controllers for each display. Early versions of Lotus 1-2-3™, for example, took advantage of this technique by allowing a user to view two different displays (MDA and CGA) simultaneously. Such a technique was possible, as each controller used a different logical address in the memory of the host computer.

The Apple™ Powerbook™ computer is believed to use a similar dual controller technique to provide for two different displays having the same resolution and refresh rate. In the lap-top or notebook environment, however, the use of two separate controllers can increase power drain and increase cost, weight and size of the computer, all especially critical in the highly competitive notebook computer market.

Co-pending application Ser. No. 08/130,577, filed Oct. 1, 1993 entitled "DUAL DISPLAY VIDEO CONTROLLER" describes an apparatus and technique for generating two video display signals from a single video controller in order to create different display images on two video displays. In a first embodiment of that invention, both resolutions may have the same resolution and refresh rate.

Due to practical considerations, such as data bandwidth, it may be desirable in such a system to provide both displays at the same resolution and refresh rate. However, in practical applications, it may be desirable to generate signals for two video displays having different resolutions, pixel depths, and/or refresh rates. For example, it may be desirable to generate two displays in different graphics modes, or one display in a graphics mode and another in text mode. Moreover, two different displays (e.g., flat panel display and CRT) may use refresh rates different from one another. Alternately, one display may provide improved performance operating at a particular refresh rate unavailable for the other display.

In addition, wider DRAMs have become more readily available. Such DRAMs may have a width of 32, 64 or 128 bits. In such wide DRAMs, as many as 32, 64, or 128 bits may be read or written in one data read or write cycle. Thus use of such wide DRAMs for display memory may improve data bandwidth.

SUMMARY AND OBJECTS OF THE INVENTION

A video controller integrated circuit simultaneously generates CRT and LCD display signals for CRT and LCD video displays having independent refresh rates and pixel resolutions. A display memory data bus couples the video controller integrated circuit with a display memory. A CRT display data clock has a frequency characteristic of refresh rate and pixel resolution of a CRT display. An LCD display data clock has a frequency characteristic of refresh rate and pixel resolution of an LCD display independent of the CRT display data clock.

A CRT display data pipeline coupled to the display memory data bus and the CRT display data clock processes CRT display data synchronous with the CRT display data clock. A CRT FIFO, coupled to the display memory bus, receives and temporarily stores CRT display data from the display memory during a CRT data read cycle. A CRT video data path, coupled to the CRT FIFO, receives CRT display data and decompresses compressed portions of the CRT display data and outputs CRT pixel data. A look up table, coupled to the CRT video data path, receives CRT pixel data from the CRT video data path and outputs output CRT pixel data at an address in the look up table corresponding to the CRT pixel data. A digital to analog converter, coupled to the look up table, receives output CRT pixel data from the look up table and outputs an analog CRT display signal.

An LCD display data pipeline, coupled to the display memory data bus and the LCD display data clock, processes LCD display data synchronous with the LCD display data clock. An LCD FIFO, coupled to the display memory bus, receives and temporarily stores LCD display data from the display memory during an LCD data read cycle. An LCD video data path, coupled to the LCD FIFO, receives LCD display data and decompresses compressed portions of the LCD display data and outputs LCD pixel data. A look up table, coupled to the LCD video data path, receives LCD pixel data from the LCD video data path and outputs output LCD pixel data at an address in the look up table corresponding to the LCD pixel data. A dither controller, coupled to the look up table, receives the output LCD pixel data and generates spatial dithering of the output LCD data to produce dithered output LCD pixel data. A shade controller, coupled to the dither controller, receives the dithered output LCD pixel data and temporally shades the dithered output LCD pixel data to produce shaded dithered output LCD pixel data for passive matrix LCD panel output.

A half-frame buffer write FIFO, coupled to the shade controller and the display memory data bus, receives shaded dithered output LCD pixel data, temporarily stores the shaded dithered output LCD pixel data, and transfers the shaded dithered output LCD pixel data to a half-frame buffer portion of the display memory through the display memory data bus. A half-frame buffer read FIFO, coupled to the display memory data bus and has a passive matrix LCD data output, receives shaded dithered output LCD pixel data from the half-frame buffer portion of the display memory through the display memory data bus, temporarily stores the shaded dithered output LCD pixel data, and outputs the shaded dithered output LCD pixel data to a passive matrix LCD through the passive matrix LCD data output.

An active matrix LCD data output coupled to the shade controller outputs shaded dithered LCD output data to an active matrix LCD.

A television output coupled to the look up table of the CRT display data pipeline, receives the CRT output pixel data and converts the CRT output pixel data into a television display signal.

In an alternative embodiment, a video controller integrated circuit for simultaneously generating CRT and LCD display signals for CRT and LCD video displays having independent refresh rates and pixel resolutions includes a CRT/LCD display data pipeline, coupled to display memory for processing CRT/LCD display data.

The CRT display data pipeline includes a CRT/LCD FIFO, coupled to display memory, for receiving and temporarily storing CRT display data and LCD display data from the display memory during respective CRT and LCD data read cycles and for storing a data tag with each CRT display data and LCD display data indicating whether data stored is CRT display data or LCD display data. A CRT/LCD video data path, coupled to the CRT/LCD FIFO, receives CRT display data and LCD display data and corresponding data tags and decompresses compressed portions of the CRT display data and LCD display data and outputs CRT pixel data and LCD pixel data along with the corresponding data tags. A look up table, coupled to the CRT/LCD video data path, receives CRT pixel data and LCD pixel data and corresponding data tags from the CRT/LCD video data path and outputs output CRT pixel data and output LCD pixel data at an address in the look up table corresponding to the CRT and LCD pixel data, and outputs the corresponding data tags. A multiplexor, coupled to the look up table, receives the output CRT pixel data and output LCD pixel data and directs output CRT pixel data and output LCD pixel data based upon a value of a corresponding data tag.

Thus, one object of the present invention is to control more than one video display with a single video controller.

A further object of the invention is to produce different images on different displays using a single video controller.

Yet a further object is to produce different images on different displays in a single video controller while providing an easy to use software model writing video information for the different images into a video memory.

It is yet a further object of the present invention produce independent images having differing pixel resolutions and/ or refresh rates on different video displays.

It is a further object of the present invention to utilize available bandwidth from wide DRAMS by providing two separate data paths in a single video controller for two video displays.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE INVENTION

In the present invention, two areas of display memory may store images to be displayed in different graphics modes on different displays. One area of display memory may be displayed on a CRT or TV while another area of display memory may be displayed on another, similar display, or a dissimilar display such as a flatpanel display (e.g., LCD, TFT, electroluminescent, or the like). A CRT or TV display may be either interlaced or non-interlaced. For practical purposes, the present invention may be restricted to having the same number of bits per pixel, at least as stored in display memory. Different pixel resolutions may be displayed, however, by using pixel compression techniques (e.g, MPEG, Accupak™, 4-2-2 YUV, or the like).

In order to generate two video signals having different refresh rates and resolutions, it may be necessary to generate different dot clock frequencies, vertical and horizontal sync signals and the like. In addition, each display output may be capable of generating a MotionVideo™ window using Motion Video Architecture™ (MVA™). Aspects of MVA™ are described, for example in copending applications Ser. No. 08/235,764, filed Apr. 29, 1994, entitled "VARIABLE PIXEL DEPTH AND FORMAT FOR VIDEO WINDOWS", and Ser. No. 08/359,315, filed Dec. 19, 1994, entitled "MEMORY BANDWIDTH OPTIMIZATION".

Briefly, Motion Video Architecture™ may allow for generation of a hardware window in a video display displaying data stored in off-screen memory having a different pixel depth than the surrounding background display. For example, while running a Windows™ display in eight bits per pixel (bpp) graphics mode, a hardware MotionVideo™ window may be generated having a different pixel depth such as 16 bits per pixel. The pixel depth of the Motion-Video™ window may be generated from a compressed mode (e.g., 4-2-2- YUV, MPEG, Accupak™ or the like). Examples of hardware incorporating Motion Video Architecture™ include the Cirrus Logic GD-5440,–7543, and –7548 graphics controller integrated circuits.

Figure 2:
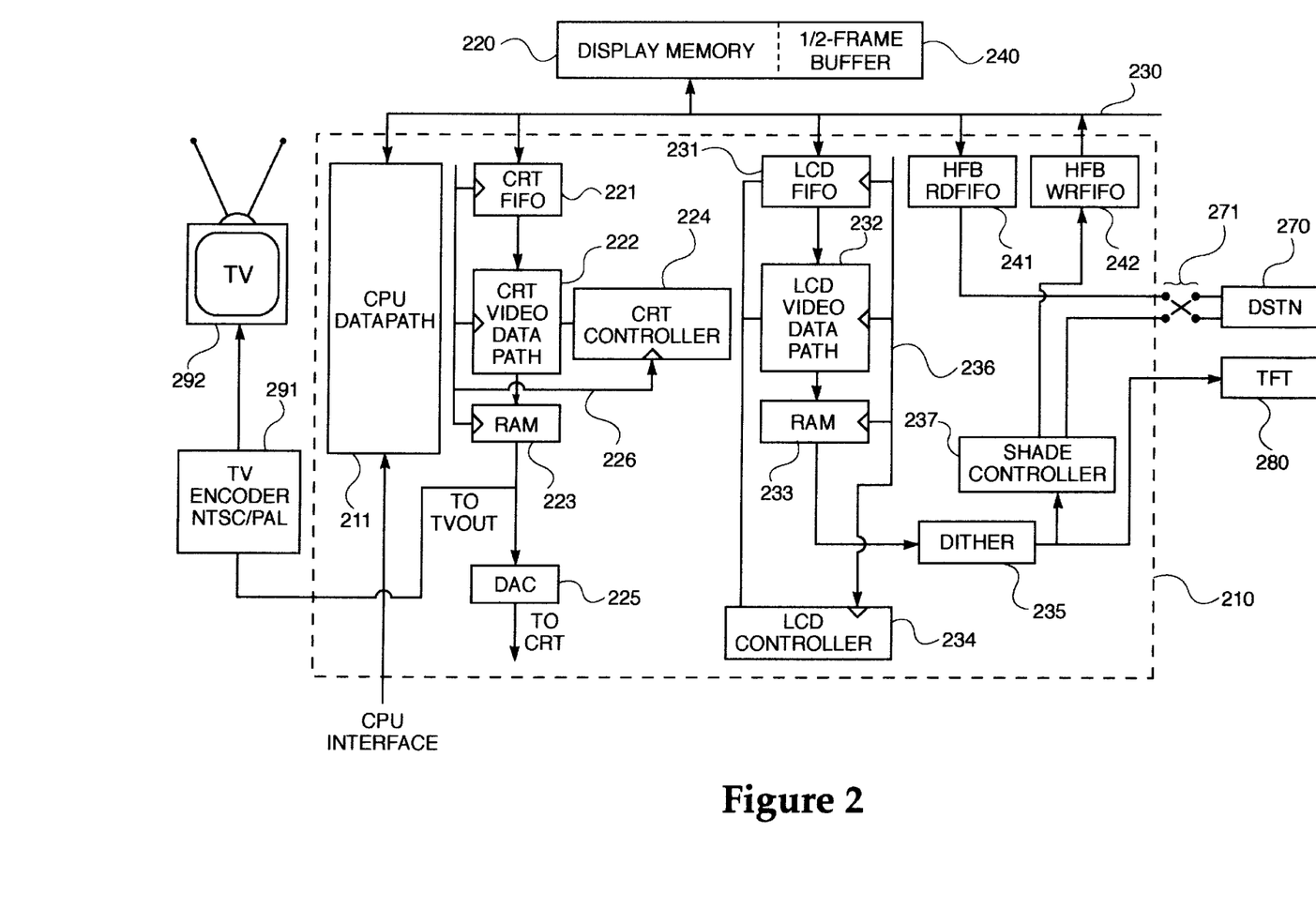
FIG. 2 is a block diagram of a first embodiment of a video controller of the present invention.

FIG. 2 is a block diagram illustrating the overall architecture of a first embodiment of the graphic controller of the present invention. In FIG. 2, graphic controller 210 may be coupled to display memory 220 via data bus 230. A portion of display memory 220 may be set aside as half-frame buffer 240 for use in generating flat panel display images, for example, for dual panel super-twist neumatic (DSTN) display 270.

Within graphic controller 210 may be provided CPU datapath 211. CPU datapath 211 may interface graphic controller 210 with an external host CPU (not shown) as in known in the art. CPU data path may include necessary buffers and bus protocol interface hardware to allow an external host CPU to read or write data to or from graphic controller 210. In general, CPU datapath 211 may receive graphics, text, or video data from external host CPU for storage in display memory 220. In addition, control information (e.g., video mode selection or the like) may be received from external host CPU (not shown) through CPU datapath 211 for storage in data registers (not shown) within graphic controller 210, as is known in the art.

In the apparatus of FIG. 2, two separate data paths may be provided for generating two independent video images on separate video displays. Although shown here as two data paths, it is within the spirit and scope of the present invention to provide additional data paths to generate additional video displays. A first data path may be used to generate a display signal to drive a CRT, television, or the like.

Coupled to data bus 230 is CRT FIFO 221. CRT FIFO 221 may receive data from display memory 220. CRT FIFO 221 may be suitably sized to maintain a continuous flow of data to generate a CRT or TV output signal. CRT FIFO 221 may be further coupled to CRT video data path 222. CRT video data path 222 may modify or augment video data from CRT FIFO 221. For example, CRT video data path 222 may provide a MotionVideo™ window using MVA™ architecture. Moreover, CRT video data path 222 may provide decompression of pixel data in packed (compressed) pixel modes. CRT FIFO 221 and CRT video data path 222 may be under control of CRT controller 224 which may provide sequence control to process data from CRT FIFO 221 through CRT video data path 222. CRT FIFO 221, CRT video data path 222, and CRT controller 224 may be driven by CRT clock 226 driven at a frequency characteristic of the output video display (e.g., multiple of the refresh rate of TV or CRT).

Data from video CRT data path 222 may then be passed to RAM 223. RAM 223 may comprise a look up table (LUT) as is known in the art. Pixel data received from display memory 220 and processed through CRT video data path 222 may be used as a memory address in RAM 223 to look up a corresponding pixel color. For example, eight bit pixel data may be used as an address to retrieve eighteen bit output pixel data as is known in the art.

The output of RAM 223 may then pass to digital to analog converter (DAC) 225. DAC 225 may comprise a number of current sources which may be selectively switched to produce a step-wise analog signal as is known in art. For example, as discussed above, output pixel data may comprise 18 bits –6 bits each for red, green and blue (RGB). Each bit of these six bit groups may switch one of six current sources for a given color signal to produce a corresponding analog output signal, as is known in the art.

Alternately, the output of RAM 223 may be fed to TV output circuitry 291 to generate an analog or digital TV output signal. to television 292. TV output circuitry 291 may be one of any known analog television encoders, such as the Analog Devices™ model AD720 television encoder. Such an encoder may output NTSC or PAL type televisions signals. Alternately other types of encoders may be used to output other types of television signals such as SECAM, HDTV or the like.

A separate data path is provided in the apparatus of FIG. 2 for LCD data. Although described here as LCD data, the apparatus of the present invention may generate data for other types of flat panel video displays (e.g., active and passive matrix LCD, electroluminescent, or the like). Moreover, although illustrated here as providing a CRT/TV data path and an LCD data path, the present invention may be implemented to provide two distinct CRT data paths, two LCD data paths, dedicated TV data paths, or any combination of data paths which may be utilized within available display memory bandwidth. Moreover, selectively enabled separate data paths may be provided to drive multiple displays within the spirit and scope of the present invention.

It is natural that TV and CRT data paths may be shared to conserve hardware. TV may require interlaced modes which are supported by CRT for CRT interlaced modes display, even though dot-clock frequency difference for TV and CRT are different (12–16 MHz versus 44 MHz or higher).

Coupled to data bus 230 is LCD FIFO 231 which receives video data from display memory 220. LCD FIFO 231 may be suitably sized to maintain a continuous flow of data to generate an LCD or TV output signal. LCD FIFO 231 is further coupled to LCD video data path 232. LCD video data path 232 may modify or augment video data from LCD FIFO 231. For example, LCD video data path 232 may provide a MotionVideo™ window using MVA™ architecture. Moreover, LCD video data path 232 may provide decompression of pixel data in packed (compressed) pixel modes. LCD FIFO 231 and LCD video data path 232 may be under control of LCD controller 234 which may provide sequence control to process data from LCD FIFO 231 through LCD video data path 232. LCD FIFO 231, LCD video data path 232, and LCD controller 234 may be driven by LCD clock 236 driven at a frequency characteristic of the output video display (e.g., multiple of the refresh rate the LCD display).

Data from LCD video data path 232 may then be passed to RAM 233. RAM 233 may comprise a look up table (LUT) as is known in the art. Pixel data received from display memory 230 and processed through LCD video data path 232 may be used as a memory address in RAM 233 to look up a corresponding pixel color. For example, eight bit pixel data may be used as an address to retrieve eighteen bit output pixel data as is known in the art.

The output of RAM 223 may then pass to dither control 235. Dither control 235 may provide spatial dithering by altering adjacent pixels. Such frame rate modulation and dithering techniques are described in Bassetti, Jr., U.S. Pat. No. 5,122,783, issued Jun. 16, 1992, assigned to the same assignee as the present application and incorporated herein by reference. The output of dither control 235 may be used to drive a active matrix type LCD display such as thin-film transistor (TFT) display 230. Such an output may be utilized to drive other types of displays which operate using similar techniques as TFT 280. The output of dither control 235 may then pass to shade controller 237. Shade controller 235 may provide shading by altering temporally altering the number of times per second a given pixel may be activated. Such shade control techniques as such are known in the art.

Data from shade controller 237 may be used to directly drive a passive matrix type LCD display (e.g., single scan super twist neumatic LCD panel). Alternately, data from shade controller 237 may be used to drive a dual scan passive matrix display (e.g., dual scan super twist neumatic LCD panel or DSTN, 270). A dual scan display may prevent or reduce flicker or fade present in single scan displays by dividing a passive matrix display into upper and lower panel halves and driving the refreshing the two halves separately. Data for a first half of a video frame may pass from shade controller 237 through a switching mechanism 271 to directly refresh one half of DSTN 270. Data for a second half of a video frame may pass through half-frame write FIFO 241 for storage in half-frame buffer 240 within display memory 220. Data from half-frame buffer 240 within display memory 220 may then pass through half-frame buffer read FIFO and a switching mechanism 271 to refresh another half of DSTN 270. Switching mechanism 271 may be provided to switch between upper and lower panel halves and input sources such that data directly from shade controller 237 and that stored in half frame buffer 240 is alternated between the two panel halves, as is known in the art.

It should be noted here that the output data paths for LCD data are shown by way of example only. It may be desirable to provide a video controller within the spirit and scope of the present invention supporting only one of the two types of flat panel displays shown, or supporting other types of flat panel displays not shown.

It can be immediately appreciated that the data path for CRT/TV data shares few common elements with the flat panel display data path. As the data paths are largely separate, separate CRT and LCD clocks may be provided at differing clock frequencies. Thus, displays having differing refresh rates or pixel resolutions may be more readily supported.

CRT controller 224 of Figure may generate a number of VGA compatible signals for a CRT such as known in the art such as Horizontal Display Enable (HDE) Vertical Display Enable (VDE), HSYNC, VSYNC, Line Compare, Underline and Cursor On Line. In a prior art dual display system, such as that of FIG. 1, LCD display and control signals may be generated from such CRT signals. In the system of FIG. 2, LCD controller 234 may independently generate VGA compatible control signals for an LCD signals, such as HDE, VDE, Vertical Pulse (LFS), Horizontal LCD Pulse (LCLK) and LCD Panel Clock or Shift Clock (SCLK). The architecture of FIG. 2 more readily permits the use of independent refresh rates and pixel resolutions on different displays, as the control signals driving both displays may be independently generated.

Moreover, the nature of LCD and CRT displays is such that the fundamental control signals may vary considerably for a CRT display depending upon graphics mode, whereas for an LCD display, such control signals may remain fixed regardless of graphics modes. For example, a 800×600 pixel LCD panel contains a fixed number of physical pixels, whereas a CRT may generate a different number of pixels, due to its analog nature, depending upon video mode (i.e., pixel resolution). Thus, in a prior art dual display video controller, control signals may be generated at a first pixel resolution for a CRT display, and then converted to drive an LCD display of fixed resolution.

In the apparatus of FIG. 2, LCD controller 234 may be configured to generate control signals for the fixed resolution of an LCD display. Thus, while the apparatus of FIG. 2 may present additional components due to the use of dual data paths, the overall complexity of the system may be reduced by eliminating complex circuitry needed to reformat CRT control signals into constant format LCD control signals.

VGA CRT controllers uses a character clock (8 or 9 or equivalent of 16 dot clock units) as a programming unit for horizontal timing of CRT signals (HSYNC, HBLANK, HDE, HTOTAL). This makes horizontal timing signals mode dependent and require different data to program in different graphics modes. With a dedicated LCD controller this is not needed. An LCD controller will be programmed at POST (Power On Self Test) for a given LCD type for line clock and HSYNC as well as blank and horizontal total and panel width. As long as these values are programmed in dot clock or fixed multiple of dot clocks there is no need to reprogram these values no matter which graphics mode is used.

Moreover, the apparatus of FIG. 2 takes advantage of the increased bandwidth available from 64-bit wide (and wider) DRAMs by separately feeding data from display memory 220 in two data read cycles through separate data paths. Each display may be generated at a different resolution or refresh rate. Moreover, one display may be generated in interlaced mode, and another display generated in a non-interlaced mode.

Figure 3:
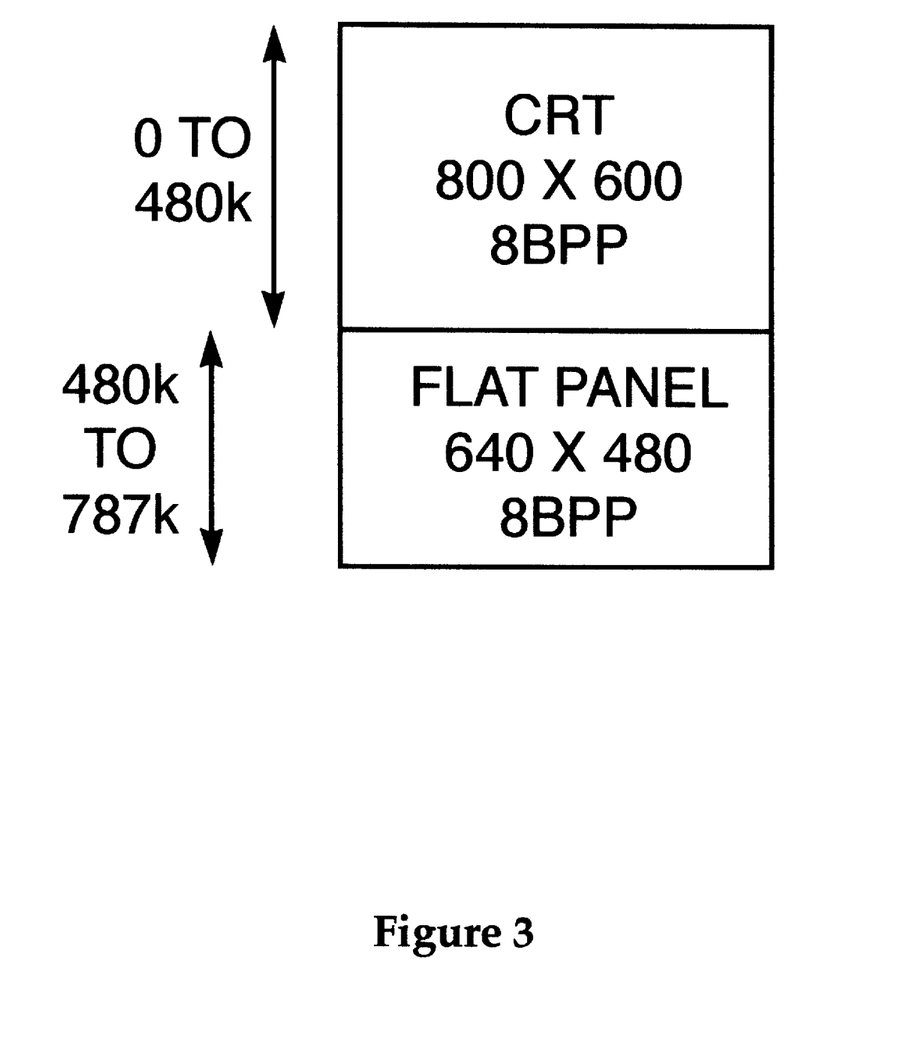
FIG. 3 is a diagram of an example of a memory map corresponding to the schematic of FIG. 2.

From the perspective of the programmer, the apparatus of the FIG. 2 may be easier to write software for. FIGS. 3 and 4 illustrate memory map models for storing two video images in display memory 220. Display memory 220 may be divided into two areas. For the Examples of FIGS. 3 and 4, a CRT display is running at a resolution of 800×600 pixels, and the flat panel display at a resolution of 640×480 pixels, both a eight bits per pixel (bpp) in a packed (compressed) pixel mode.

Separate screen start registers, horizontal and vertical total registers, offset registers or the like may be provided within graphic controller 210 to provide control indication during read and write cycles to and from display memory 220. In addition, separate line compare registers may also be provided for each section of display memory 220. Moreover, registers indicating to software the pitch and width of the two screens may be provided such that the display driver software may make appropriate calculations when accessing either surface.

Figure 5:
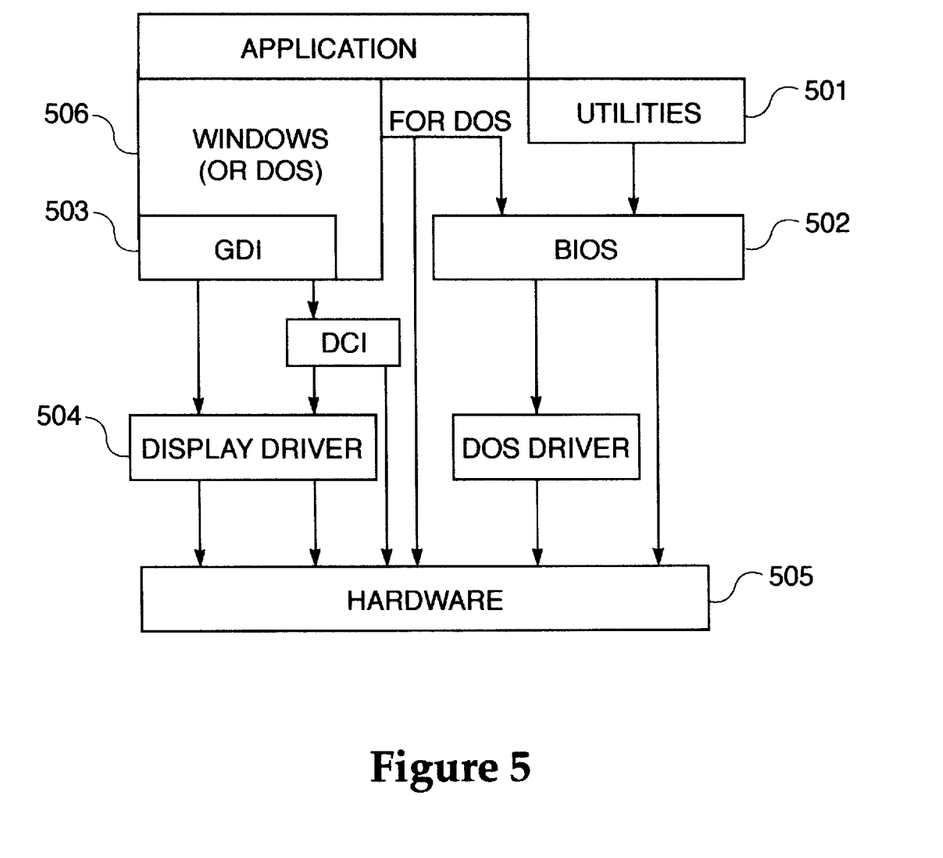
FIG. 5 is a block diagram of a software model for the apparatus of FIG. 2.

FIG. 5 illustrates the overall software model and logical flow of control through various software modules to the hardware of FIG. 2. In the most typical application, a user may activate the dual display of the present invention through utilities 501 provided by the video controller manufacturer. Utilities 501 may inform BIOS 502 that it has to program relevant video controller registers such that flat panel and CRT will display different data. Thus, the flat panel display and CRT may fetch data from different sections of display memory 220.

If Microsoft™ Windows™ 506 is running, the option to activate the dual display mode of the present invention may be activated by maximizing an icon (as is done for prior art SIMULSCAN™ displays) and selecting dual display mode through "radio" buttons and drop down list choices and by clicking on an "OK" button. The request may then be passed by the Graphic Driver Interface (GDI) 503 to display driver 504 and hardware 505 will be programmed accordingly.

Windows™ program 506 may have to be restarted after such a selection, as some variable which Windows™ 506 uses for interpreting a display may not be dynamically modifiable. Once in operation, a user may operate in the Windows™ environment by moving the mouse beyond the right edge of the CRT screen (for example, using the display model of FIGS. 4A and 4B) to work on an application on the flat panel screen or by moving the mouse beyond the lower edge of the CRT screen (using the display models of FIGS. 4C and 4D) to work on the LCD screen. To move back to the CRT screen, a user merely moves the mouse in the opposite direction to change screens. Alternately, a user may switch screens by pressing a "hotkey" or the like, for example within an application program supporting dual displays, or for example in a DOS environment. Alternately, two display mouse pointers may appear, one on each screen, and a user may move between screens by clicking a mouse or hitting a hot key. Each display mouse pointer may have a "hard point" which may be present to indicate which pointer is active at any given time.

Figure 4A:
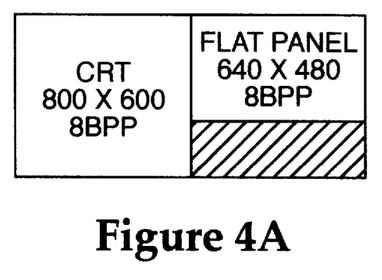
FIG. 4A is a diagram of a first embodiment of a display map corresponding to the schematic of FIG. 2 showing how two displays may make up one picture horizontally.

FIG. 4A is a diagram of a first embodiment of a display map corresponding to the schematic of FIG. 2 showing how two displays may make up one picture horizontally. In the display map of FIG. 4A, the two images may be placed adjacent to each other. Thus, a software designer may write software to generate a continuous image as shown in FIG. 4A. Such an image may be stored in display memory in a configuration similar to that of FIG. 4A or in an alternative configuration, such as that shown in FIG. 3. It should be noted that the arrangement illustrated here, with the CRT having a higher pixel resolution than the LCD is for purposes of illustration only. In actual use, an LCD may have a higher resolution (or equal resolution) as a CRT, depending upon LCD panel type and CRT video mode.

Figure 4B:
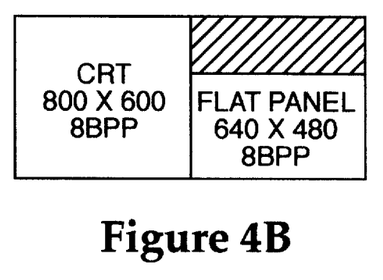
FIG. 4B is a diagram of a second embodiment of a display map corresponding to the schematic of FIG. 2 showing how two displays may make up one picture horizontally.
Figure 4C:
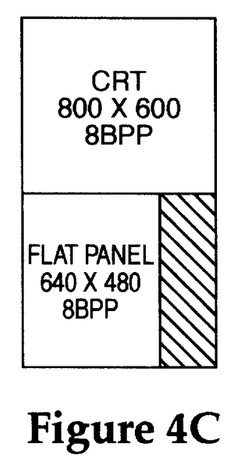
FIG. 4C is a diagram of a third embodiment of a display map corresponding to the schematic of FIG. 2 showing how two displays may make up one picture vertically.
Figure 4D:
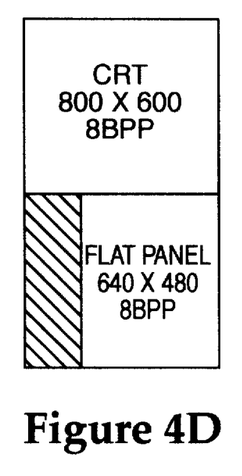
FIG. 4D is a diagram of a fourth embodiment of a display map corresponding to the schematic of FIG. 2 showing how two displays may make up one picture vertically.

FIGS. 4B, 4C, and 4D are diagrams second, third, and fourth embodiments of display maps corresponding to the schematic of FIG. 2 showing how two displays may make up one picture horizontally and vertically. The embodiments of FIGS. 4A–D are in no way exhaustive. Other types of display maps may be suitably created placing the two images adjacent to each other. Alternatively, it is possible, within the spirit and scope of the present invention, to provide a fill area between the two displays.

Figure 6:
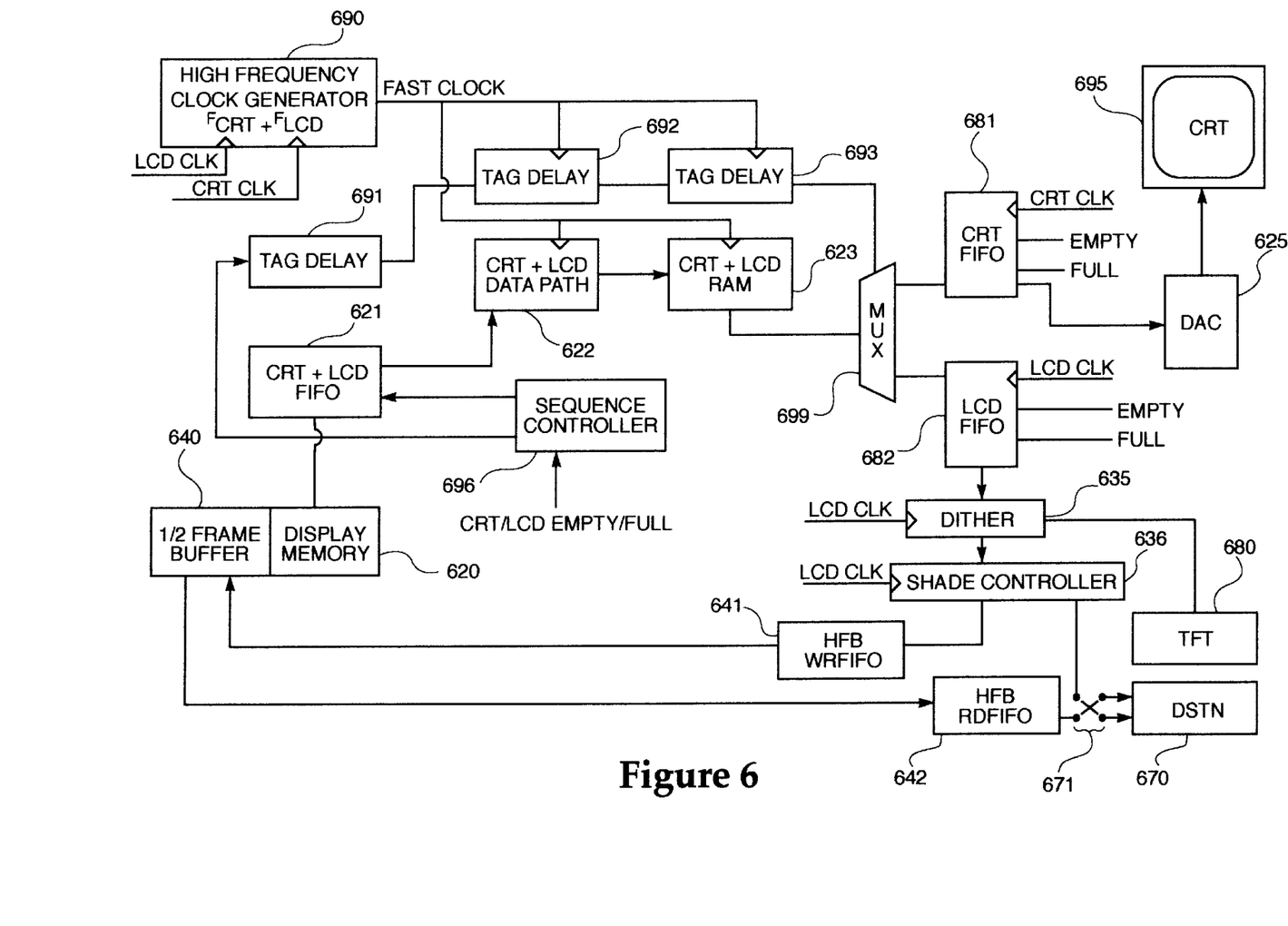
FIG. 6 is a block diagram of a second embodiment of the present invention.

FIG. 6 is a block diagram illustrating an alternative embodiment of the apparatus of FIG. 2, using data tagging in place of dual data paths. Data tagging refers to the practice of supplying an additional bit or "tag" in each data register, latch, or the like, to indicate the source or destination of the data in the remaining bits of the register, latch or the like. In this case data may be CRT or LCD data depending on the memory area it was fetched from. After being read form display memory, data is tagged.

In the embodiment of FIG. 6, CRT and LCD display data may be stored in display memory 630 using one of the memory models of FIGS. 3 and 4. Sequence controller 626 controls data reads from display memory 620 to CRT+LCD FIFO 621. Each level of CRT+LCD FIFO 621 may be provided with a corresponding tag stored in tag delay 691. Although illustrated as a separate element in FIG. 6 for clarity, tag delay 691 may actually comprise an "extra" bit of data within CRT+LCD FIFO 621. Thus, for example, if CRT+LCD FIFO 621 is designed to contain 32 bit data words, CRT+LCD FIFO 621 may be designed 33 bits wide. The "extra" bit indicates whether the associated data word contains CRT or LCD pixel data.

Data from CRT+LCD FIFO may then pass to CRT+LCD data path 622 where pixel data may be modified, for example, decompressed. Associated tag data for each data word may indicate to CRT+LCD data path what data manipulation is to be performed for CRT and LCD data. From CRT+LCD data path 622, data is passed to CRT+LCD RAM 623 for conversion into output pixel data, as is known in the art. Throughout these steps, the associated data tag passes through tag delays 692 and 693 so as to maintain each data tag with its corresponding data word. Again, tag delays 692 and 693 are illustrated as separate elements for the purposes of illustration but may be provided within corresponding elements 622 and 623 in an actual hardware implementation.

In this approach, CRT & LCD FIFO 622 may be read by the common CRT and LCD data path at high speed, a speed higher than or equal to CRT clock frequency and LCD clock frequency. As illustrated in FIG. 6, high frequency clock generator 699 may output a high frequency clock signal (fast clock) calculated as follows:

$$f_{fast\ clock} >= f_{CRT} + F_{LCD}$$

The frequency of $f_{fast}$ clock may be preset to a frequency higher than any anticipated combination of CRT and LCD clock frequencies. Alternately, $f_{fast\ clock}$ may be set using inputs from $F_{CRT}$ and $F_{LCD}$, as illustrated in FIG. 6. For example, an 800×600 pixel resolution CRT display and a 640×480 pixel resolution LCD display used together in a dual display mode, $f_{fast\ clock}$ could be calculated as frequency greater than or equal to the sum of $F_{CRT} + f_{LCD}$ or 40 Mhz+25 Mhz=65 Mhz common dot clock. LCD FIFO 682 may be read at LCD CLK of 25 Mhz and CRT FIFO 681 may be read at CRT CLK 40 Mhz dot clock.

The output of tag delay 693 may be used to drive MUX 699 which diverts each data word to the appropriate data path. CRT data may be diverted to CRT FIFO 681. LCD data may be diverted to LCD FIFO 682. Each of CRT and LCD FIFOs 681 and 682 may be provided with EMPTY and FULL pointers indicating the relative emptiness or fullness of each FIFO, respectively. EMPTY and FULL pointers of CRT and LCR FIFOs 681 and 682 may be fed to sequence controller 696. Sequence controller 696 may then read an appropriate amount of CRT or LCD data from display memory 620 into CRT+LCD FIFO 621 so as to maintain a continuous flow of CRT and LCD data.

The use of EMPTY and FULL pointers in CRT and LCD FIFOs 681 and 682 as feedback to sequence controller 696 and the use of data tagging allows for dual displays of different refresh rates and resolutions. In other types of dual displays, where refresh rates and resolutions of both displays are identical, CRT and LCD data may be diverted to appropriate data paths merely by counting the number of words diverted to each data path. For example, a number of read cycles may be performed for CRT data, followed by an identical number of read cycles for LCD data. If both displays have the same resolution and refresh rate, such counting techniques may be readily implemented.

However, for different refresh rates (e.g., 60 Hz and 75 Hz) and different pixel resolutions (e.g., 640×480 and 800× 600) such counting techniques may be difficult to achieve, as the two displays are rarely in phase at any given time. The apparatus of FIG. 6 allows for use of a single data path in an asynchronous dual display environment.

The outputs of CRT and LCD FIFOs 681 and 682 are passed to conventional CRT and LCD data paths. CRT data from CRT FIFO 681 may pass to a DAC 625 and then to CRT 695. LCD data from LCD FIFO 682 may pass to dither control 635 and then to a thin film transistor (active matrix) display 680. Alternately, the output of dither control 635 may be passed to shade controller 636 and then to half-frame buffer write FIFO, to half-frame buffer 640, through half-frame buffer read FIFO and then to dual scan supertwist neumatic (passive matrix) display 670.

Again, while the embodiment of FIG. 6 has been illustrated for a CRT and LCD display, other types of displays may be used without departing from the spirit and scope of the present invention. The use of CRT and LCD displays merely reflects one embodiment where, for a portable laptop computer, it may be desirable to use both internal LCD displays and external CRT displays when in a "docked" position or connected to an external CRT.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A video controller integrated circuit for simultaneously generating CRT and LCD display signals for CRT and LCD video displays, the CRT and LCD display signals having independent refresh rates and pixel resolutions, said video controller integrated circuit comprising:
    a display memory data bus, for coupling the video controller integrated circuit with a single display memory containing both CRT and LCD display data;
    a CRT display data clock having a frequency characteristic of refresh rate and pixel resolution of a CRT display;
    an LCD display data clock having a frequency characteristic of refresh rate and pixel resolution of an LCD display independent of said CRT display data clock;
    a CRT display data pipeline, coupled to said display memory data bus and said CRT display data clock, for processing CRT display data synchronous with said CRT display data clock, said CRT display data pipeline comprising:
        a CRT FIFO, coupled to said display memory bus, for receiving and temporarily storing CRT display data from the display memory during a CRT data read cycle,
        a CRT video data path, coupled to said CRT FIFO, for receiving CRT display data and decompressing compressed portions of said CRT display data and outputting CRT pixel data,
        a look up table, coupled to said CRT video data path, for receiving CRT pixel data from said CRT video data path and outputting output CRT pixel data at an address in said look up table corresponding to said CRT pixel data, and
        a digital to analog converter, coupled to said look up table, for receiving output CRT pixel data from said look up table and outputting an analog CRT display signal; and
    an LCD display data pipeline, parallel to the CRT display data pipeline, coupled to said display memory data bus and said LCD display data clock, for processing LCD display data synchronous with said LCD display data clock, said LCD display data pipeline comprising:
        an LCD FIFO, coupled to said display memory bus, for receiving and temporarily storing LCD display data from the display memory during an LCD data read cycle,
        an LCD video data path, coupled to said LCD FIFO, for receiving LCD display data and decompressing compressed portions of said LCD display data and outputting LCD pixel data, and
        a look up table, coupled to said LCD video data path, for receiving LCD pixel data from said LCD video data path and outputting output LCD pixel data at an address in said look up table corresponding to said LCD pixel data.

2. The video controller integrated circuit of claim 1, further comprising:
    a dither controller, coupled to said look up table, for receiving said output LCD pixel data and generating spatial dithering of said output LCD data to produce dithered output LCD pixel data.

3. The video controller integrated circuit of claim 2, further comprising:
    a shade controller, coupled to said dither controller, for receiving said dithered output LCD pixel data and temporally shading said dithered output LCD pixel data to produce shaded dithered output LCD pixel data.

4. The video controller integrated circuit of claim 3, further comprising:
    a half-frame buffer write FIFO, coupled to said shade controller and said display memory data bus, for receiving shaded dithered output LCD pixel data, temporarily storing the shaded dithered output LCD pixel data, and transferring the shaded dithered output LCD pixel data to a half-frame buffer portion of the display memory through said display memory data bus; and
    a half-frame buffer read FIFO, coupled to said display memory data bus, for receiving shaded dithered output LCD pixel data from the half-frame buffer portion of the display memory through said display memory data bus, temporarily storing the shaded dithered output LCD pixel data, and outputting the shaded dithered output LCD pixel data; and
    a dual scan passive matrix LCD data output, coupled to said half-frame buffer read FIFO and said shade controller, for outputting to a first half of a dual scan passive matrix LCD shaded dithered output LCD pixel data from said shade controller and outputting to a second half of a dual scan passive matrix LCD shaded dithered output LCD pixel data from said half-frame buffer read FIFO.

5. The video controller integrated circuit of claim 2, further comprising:
    an active matrix LCD data output coupled to said dither controller for outputting dithered LCD output data to an active matrix LCD.

6. The video controller integrated circuit of claim 2, further comprising:
    a single scan passive LCD data output coupled to said shade controller for outputting shaded dithered LCD output data to a single scan passive matrix LCD.

7. The video controller integrated circuit of claim 1, further comprising:

a television signal output coupled to said look up table of said CRT display data pipeline, for receiving said CRT output pixel data and converting said CRT output pixel data into a television display signal and outputting the television display signal.

8. An apparatus for simultaneously generating first and second display signals for first and second video displays, the first and second display signals having independent refresh rates and pixel resolutions, said apparatus comprising:

a display memory data bus, for coupling the apparatus with a display memory;

a first display data clock having a frequency characteristic of refresh rate and pixel resolution of a first display;

an second display data clock having a frequency characteristic of refresh rate and pixel resolution of an second display independent of said first display data clock;

a first display data pipeline, coupled to said display memory data bus and said first display data clock, for processing first display data synchronous with said first display data clock; and an second display data pipeline, parallel to the first display data pipeline, coupled to said display memory data bus and said second display data clock, for processing second display data synchronous with said second display data clock.

9. The apparatus of claim 8, wherein said first display data pipeline comprises:

a first FIFO, coupled to said display memory bus, for receiving and temporarily storing first display data from the display memory during a first data read cycle.

10. The apparatus of claim 9, wherein said first display data pipeline further comprises:

a first video data path, coupled to said first FIFO, for receiving first display data and decompressing compressed portions of said first display data and outputting first pixel data.

11. The apparatus of claim 10, wherein said first display data pipeline further comprises:

a look up table, coupled to said first video data path, for receiving first pixel data from said first video data path and outputting output first pixel data at an address in said look up table corresponding to said first pixel data.

12. The apparatus of claim 11, wherein said first display data pipeline further comprises:

a digital to analog converter, coupled to said look up table, for receiving output first pixel data from said look up table and outputting an analog first display signal.

13. The apparatus of claim 8, wherein said second display data pipeline comprises:

a second FIFO, coupled to said display memory bus, for receiving and temporarily storing second display data from the display memory during an second data read cycle.

14. The apparatus of claim 13, wherein said second display data pipeline comprises:

a second video data path, coupled to said second FIFO, for receiving second display data and decompressing compressed portions of said second display data and outputting second pixel data.

15. The apparatus of claim 14, wherein said second display data pipeline comprises:

a look up table, coupled to said second video data path, for receiving second pixel data from said second video data path and outputting output second pixel data at an address in said look up table corresponding to said second pixel data.

16. The apparatus of claim 15, wherein said second display data pipeline comprises:

a dither controller, coupled to said look up table, for receiving said output second pixel data and generating spatial dithering of said output second data to produce dithered output second pixel data.

17. The apparatus of claim 16, wherein said second display data pipeline comprises:

a shade controller, coupled to said dither controller, for receiving said dithered output second pixel data and temporally shading said dithered output second pixel data to produce shaded dithered output second pixel data.

18. The apparatus of claim 17, further comprising:

a half-frame buffer write FIFO, coupled to said shade controller and said display memory data bus, for receiving shaded dithered output second pixel data, temporarily storing the shaded dithered output second pixel data, and transferring the shaded dithered output second pixel data to a half-frame buffer portion of the display memory through said display memory data bus; and a half-frame buffer read FIFO, coupled to said display memory data bus, for receiving shaded dithered output second pixel data from the half-frame buffer portion of the display memory through said display memory data bus, temporarily storing the shaded dithered output second pixel data, and outputting the shaded dithered output second pixel data; and a dual scan passive matrix second data output, coupled to said half-frame buffer read FIFO and said shade controller, for outputting to a first half of a dual scan passive matrix LCD shaded dithered output second pixel data from said shade controller and outputting to a second half of a dual scan passive matrix LCD shaded dithered output second pixel data from said half-frame buffer read FIFO.

19. The apparatus of claim 17, further comprising:

an active matrix LCD data output coupled to said dither controller for outputting dithered second output data to an active matrix LCD display.

20. The apparatus of claim 17, further comprising:

a single scan passive matrix LCD data output coupled to said shade controller for outputting shaded dithered second output data to a single-scan passive matrix LCD display.

21. The apparatus of claim 12, further comprising:

a television signal output coupled to said look up table of said first display data pipeline, for receiving said first output pixel data and converting said first output pixel data into a television display signal and outputting the television display signal.

* * * * *